May 6, 1930.                R. T. ROYE                1,757,439
                          FLUID CONTROLLER
                        Filed March 5, 1929           2 Sheets-Sheet 1

Inventor
Richard T. Roye
By
Hardway Cathey
Attorneys

May 6, 1930.   R. T. ROYE   1,757,439

FLUID CONTROLLER

Filed March 5, 1929   2 Sheets-Sheet 2

Inventor
Richard T. Roye

By Hardway Cathey
Attorneys

Patented May 6, 1930

1,757,439

UNITED STATES PATENT OFFICE

RICHARD T. ROYE, OF HOUSTON, TEXAS

FLUID CONTROLLER

Application filed March 5, 1929. Serial No. 344,570.

This invention relates to new and useful improvements in a fluid controller.

One object of the invention is to provide a fluid controller of novel design specially designed to be incorporated into and to form a part of a flow line leading from a well and intended to restrict and control the flow of fluid through said line. In producing oil when a well is brought in it is sometimes necessary to restrict the flow of oil, particularly when the oil is flowing under strong pressure. The reason for restricting the flow of oil is well known to those familiar with the art of oil production and need not be stated in detail. The controller herein described has been designed for that purpose.

Another object of the invention is to provide a device of the character described in which the means for restricting the flow of oil are movable, preferably rotatable, so that the friction of the fluid and the gritty substances therein against said controlling means will be reduced to the end that said controlling means will be, in a large measure, relieved of friction and will not be readily worn away thereby and the fluid channel through the controller thus enlarged to a greater capacity than desired.

A still further feature of the invention resides in the provision, in a fluid controller, of adjustable controlling means for restricting the fluid channel through the controller to the end that said channel may be enlarged and restricted as desired.

With the above and other objects in view the invention has particular relation to certain novel features of construction, operation and arrangement of parts an example of which is given in this specification and illustrated in the accompanying drawing wherein:—

Figure 1:
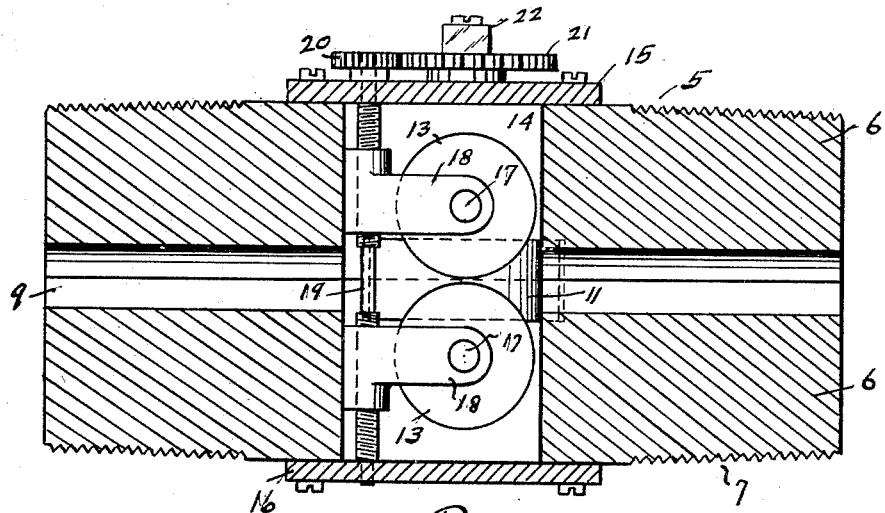
Figure 1 shows a longitudinal, sectional view through the controller.
Figure 2:
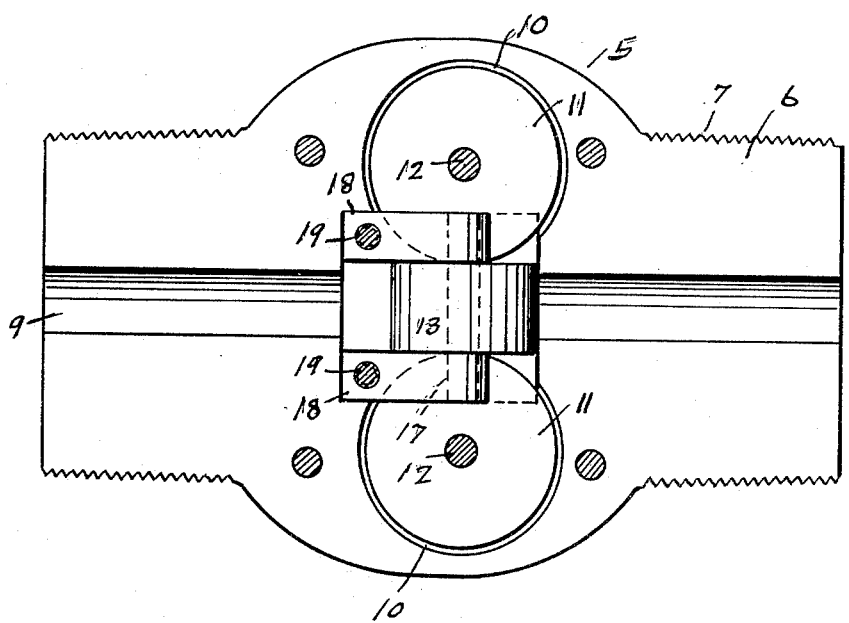
Figure 2 shows an inside view of a section of the controller showing the controlling means therein.
Figure 3:
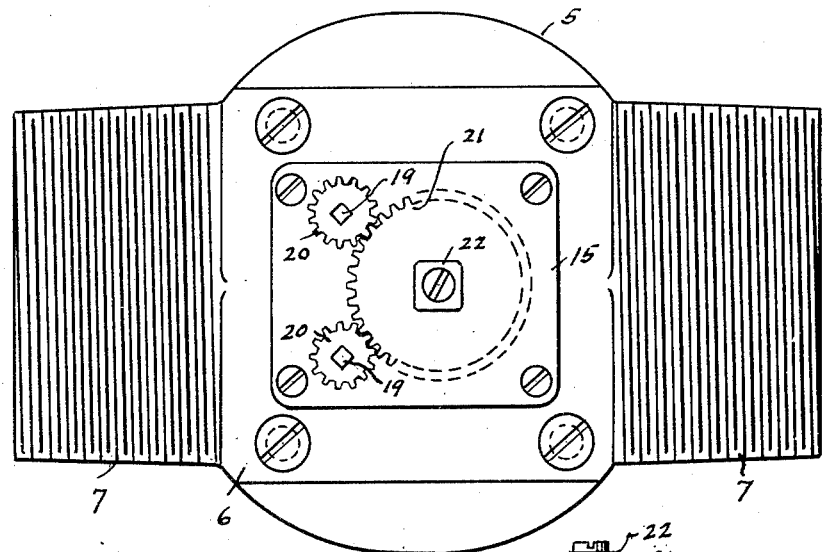
Figure 3 shows a side elevation thereof.

Referring now more particularly to the drawing wherein like numerals of reference designate similar parts in each of the figures the numeral 1 designates the well casing to the upper end of which the casing head 2 is connected and leading from said head there are the two flow lines 3, 3 each being equipped with a gate valve 4 and incorporated into each flow line there is a fluid controller designed to control the flow of fluid therethrough. Unless so controlled when the fluid is flowing under strong pressure it will often cause the collapse of the screen down in the well or the sand in the fluid will soon erode and destroy said screen.

Figure 4:
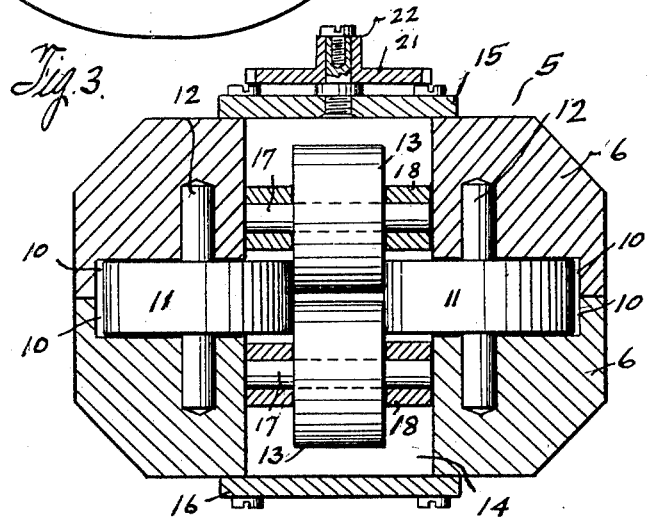
Figure 4 shows a cross sectional view.
Figure 5:
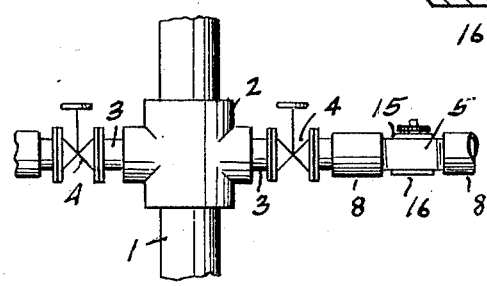
Figure 5 shows a side elevation of a casing head attached to the well casing and showing two flow lines leading therefrom one of which is equipped with said controller.

Each controller embodies a housing, designated generally by the numeral 5 composed of two sections 6, 6 whose inner facing sides are flat so that the sections may be fitted closely together as shown in Figures 1 and 4 and the ends 7, 7 of the housing are reduced and outwardly threaded to receive the collars 8, 8 by means of which the sections are held securely together and by means of which the controller is also incorporated into the line 3. The housing has the fluid conduit 9 extending therethrough axially from end to end through which the oil flows and the facing or abutting sides of the sections 6 have the pairs of registering recesses 10, 10, one pair on each side of the conduit 9, provided to receive the oppositely disposed rollers 11, 11 which are mounted on the pins 12, 12. The periphery of each roller is exposed to the fluid flowing through the conduit 9 and said rollers are rotated by said fluid and thus yield to the fluid and to the grit therein and are therefore not so liable to be worn away by the passage of gritty fluid between them. Between the rollers 11 are the oppositely disposed rollers 13, 13 which are mounted in the cavity 14 of the housing, said cavity extending transversely through said housing and being closed by the plates 15, 16 bolted to the housing. Each roller 13 is mounted to rotate on a spindle 17 the ends of said spindle being fixed in the yokes as 18 and 18. The yokes 18 of each roller 13 are mounted on the transverse shafts 19 which have end bearings in the respective plates 15 and 16. The ends of the shafts 19 are extended beyond the plate 15, and have the spur gears 20, 20 fixed thereon and in mesh with the spur gear 21 rotatably mounted on the plate 15 and having the outside nut 22 attached thereto to receive a socket wrench by means of which said gear 21 may be turned.

It is to be noted that each shaft 19 has threaded connections with the corresponding yokes 18 said threads being oppositely pitched so that when the gear 21 is turned in one direction it will operate through the gears 20 and the shafts 19 to move the rollers 13 apart to enlarge the conduit 9 between said rollers and when the gear 21 is turned in the other direction, the rollers 13 will be moved in position to restrict said conduit.

It is to be noted that the rollers 13 fit snugly between the rollers 11 as shown in Figure 4.

The oil flowing under pressure through the conduit 9 must pass between the rollers 11 and 13 and will rotate said rollers and friction between the grit in the fluid and the rollers will be relieved by reason of the movement of the rollers so that there will be a minimum of friction and the rollers will not be readily worn out by reason of said friction and will thus effectually restrict, and may be made to vary, the flow of fluid through the flow line.

What I claim is:—

1. A fluid controller comprising a housing having a fluid conduit therethrough and including independent rollers about the conduit for restricting said conduit, some of said rollers being adjustable.

2. A fluid controller having a fluid conduit therethrough, adjustable members arranged to restrict said conduit and rotatable under the influence of fluid flowing through the conduit and means for adjusting said members toward and from each other to vary the capacity of the conduit.

3. A fluid controller having a fluid conduit therethrough and including independent rotatable members disposed about said conduit and so disposed as to be impinged against, and rotated, by the fluid flowing through the conduit.

4. A fluid controller comprising a housing having a fluid conduit therethrough and including independent rotatable members disposed about said conduit so as to be impinged against, and rotated, by the fluid flowing through the conduit, some of said members being adjustable to vary the capacity of said conduit.

5. A fluid controller having a fluid conduit therethrough and including oppositely disposed rotatable members which rotate about fixed axes and oppositely disposed rotatable members which rotate about relatively adjustable axes, said members being arranged to restrict the flow of fluid through said conduit.

6. A fluid controller having a fluid conduit therethrough and including oppositely disposed rotatable members arranged to restrict said conduit, one of said members being adjustable toward or from the other member to vary the capacity of said conduit.

In testimony whereof I have signed my name to this specification.

RICHARD T. ROYE.